US011330583B2

(12) United States Patent
Tang

(10) Patent No.: US 11,330,583 B2
(45) Date of Patent: May 10, 2022

(54) TRANSMISSION TIME DETERMINATION METHOD AND DEVICE, AND COMPUTER STORAGE MEDIUM

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 78 days.

(21) Appl. No.: 16/761,217

(22) PCT Filed: Nov. 7, 2017

(86) PCT No.: PCT/CN2017/109738
§ 371 (c)(1),
(2) Date: May 1, 2020

(87) PCT Pub. No.: WO2019/090478
PCT Pub. Date: May 16, 2019

(65) Prior Publication Data
US 2020/0260441 A1     Aug. 13, 2020

(51) Int. Cl.
*H04W 72/04*     (2009.01)

(52) U.S. Cl.
CPC ..... *H04W 72/0446* (2013.01); *H04W 72/042* (2013.01)

(58) Field of Classification Search
CPC .......... H04W 72/0446; H04W 72/042; H04W 36/0058; H04W 36/0088; H04W 56/0005; H04W 56/001; H04L 5/14
See application file for complete search history.

(56) References Cited

U.S. PATENT DOCUMENTS

| | | | |
|---|---|---|---|
| 9,974,077 B2 | 5/2018 | Sartori et al. | |
| 2016/0073408 A1 | 3/2016 | Sartori et al. | |
| 2017/0048829 A1 | 2/2017 | Kim et al. | |
| 2017/0285177 A1 | 10/2017 | Jin et al. | |
| 2017/0289986 A1 | 10/2017 | Jin et al. | |
| 2018/0098322 A1* | 4/2018 | Yoon | H04W 72/0446 |
| 2020/0287691 A1* | 9/2020 | Baldemair | H04L 1/18 |
| 2021/0144601 A1* | 5/2021 | Kazmi | H04W 36/0058 |

FOREIGN PATENT DOCUMENTS

| | | |
|---|---|---|
| CN | 106717091 A | 5/2017 |
| CN | 106793109 A | 5/2017 |

OTHER PUBLICATIONS

First Office Action of the European application No. 17931262.4, dated May 31, 2021. 6 pages.
(Continued)

*Primary Examiner* — Wei Zhao
(74) *Attorney, Agent, or Firm* — Perkins Coie LLP

(57) ABSTRACT

Disclosed are a method and device for determining a transmission time, and a computer storage medium. The method includes that: a terminal receives Downlink Control Information (DCI) from a base station at a first time; and the terminal determines, based on the first time, a second time for transmitting sidelink data.

12 Claims, 5 Drawing Sheets

Mode 3

(56) References Cited

OTHER PUBLICATIONS

International Search Report in the international application No. PCT/CN2017/109738, dated Jul. 26, 2018.
ZTE. Sidelink CA in Mode 3. 3GPP TSG RAN WG1 Meeting #90 R1-1712923. Aug. 25, 2017(Aug. 25, 2017), section 2, and figures 1, 2 and 3.
Supplementary European Search Report in the European application No. 17931262.4, dated Aug. 14, 2020.
Written Opinion of the International Search Authority in the international application No. PCT/CN2017/109738, dated Jul. 26, 2018.
Second Office Action of the European application No. 17931262.4, dated Nov. 16, 2021. 6 pages.

* cited by examiner

TRANSMISSION TIME DETERMINATION METHOD AND DEVICE, AND COMPUTER STORAGE MEDIUM

CROSS-REFERENCE TO RELATED APPLICATIONS

The present application is a U.S. National Phase Entry of International PCT Application No. PCT/CN2017/109738 filed on Nov. 7, 2017, and entitled "TRANSMISSION TIME DETERMINATION METHOD AND DEVICE, AND COMPUTER STORAGE MEDIUM", the content of which is hereby incorporated by reference in its entirety.

TECHNICAL FIELD

The disclosure relates to Vehicle-to-Everything (V2X) in the field of mobile communications, and more particularly to a method and device for determining a transmission time, and a computer storage medium.

BACKGROUND

Internet of vehicles system adopts Sidelink (SL) transmission technology based on Long Term Evolution (LTE) Device to Device (D2D). Unlike a conventional LTE system in which communication data is received or transmitted through a base station, an Internet of vehicles system adopts terminal-to-terminal direct communication and thus is higher in spectrum efficiency and lower in transmission delay.

In 3rd Generation Partnership Project (3GPP) Release 14 (Rel-14), V2X is standardized, and two transmission modes are defined: mode 3 and mode 4. In the mode 3, transmission resources of a terminal can be allocated by a base station. In the mode 4, the terminal can determine transmission resources in a manner of sensing+reservation.

For the mode 3, the transmission resources of the terminal are often scheduled by the base station through control signaling, and the control signaling is carried in Downlink Control Information (DCI) and transmitted through Downlink (DL) of the system. Data of the Internet of vehicles is often transmitted through an SL. In order to reduce a transmission delay, the DL of the system may adopt a short Transmission Time Interval (sTTI) transmission mode, or the SL of the system may use an sTTI transmission mode. In a situation that the SL and DL of the system use different transmission modes, how to determine a transmission time of the SL according to the DCI of the system is a problem to be solved.

SUMMARY

To solve the above technical problem, embodiments of the disclosure provide a method and device for determining a transmission time, and a computer storage medium.

The embodiments of the disclosure provide a method for determining a transmission time, which may include that:

a terminal receives DCI from a base station at a first time; and the terminal determines, based on the first time, a second time for transmitting sidelink data.

In the embodiments of the disclosure, the method may further include that:

the terminal takes time at which a last symbol carrying the DCI is received as the first time; or the terminal takes time at which a last symbol of a subframe or of a slot carrying the DCI is received as the first time.

In the embodiments of the disclosure, the first time and the second time may be measured by a first time unit, and the first time unit is a time unit used by an SL.

In the embodiments of the disclosure, time at which the DCI is sent by the base station may be a third time.

In the embodiments of the disclosure, the method may further include that:

the terminal sends uplink information to the base station at a fourth time before the terminal receives the DCI from the base station at the first time; time at which the base station receives the uplink information is a fifth time.

In the embodiments of the disclosure, the fifth time may be specifically determined by a following manner:

the base station takes time at which a last symbol carrying the uplink information is received as the fifth time; or the base station takes time at which a last symbol of a subframe or of a slot carrying the uplink information is received as the fifth time.

In the embodiments of the disclosure, the third time and the fifth time may be measured by a second time unit, and the second time unit is a time unit used by DL.

In the embodiments of the disclosure, a duration between the fourth time and the second time may be less than a duration corresponding to a delay demand of the terminal.

The embodiments of the disclosure provide a device for determining a transmission time, which may include:

a receiving unit, configured to receive Downlink Control Information (DCI) from a base station at a first time; and a first determination unit, configured to determine, based on the first time, a second time for transmitting sidelink data.

In the embodiments of the disclosure, the device may further include:

a second determination unit, configured to take time at which a last symbol carrying the DCI is received as the first time; or take time at which a last symbol of a subframe or of a slot carrying the DCI is received as the first time.

In the embodiments of the disclosure, the first time and the second time may be measured by a first time unit, and the first time unit is a time unit used by an SL.

In the embodiments of the disclosure, time at which the DCI is sent by the base station may be a third time.

In the embodiments of the disclosure, the device may further include: a sending unit, configured to send uplink information to the base station at a fourth time, time at which the base station receives the uplink information being a fifth time.

In the embodiments of the disclosure, the fifth time may be specifically determined by a following manner:

the base station takes time at which a last symbol carrying the uplink information is received as the fifth time; or the base station takes time at which a last symbol of a subframe or of a slot carrying the uplink information is received as the fifth time.

In the embodiments of the disclosure, the third time and the fifth time may be measured by a second time unit, and the second time unit is a time unit used by DL.

In the embodiments of the disclosure, a duration between the fourth time and the second time may be less than a duration corresponding to a delay demand of the terminal.

The embodiments of the disclosure provide a computer storage medium, having a computer-executable instruction stored thereon which, when executed by a processor, enables to implement the above method for determining a transmission time.

In the technical solution of the embodiments of the disclosure, a terminal may receive DCI from a base station at a first time; and the terminal may determine, based on the first time, a second time for transmitting sidelink data. With the technical solution of the embodiments of the disclosure, the terminal can receive scheduling information, that is, DCI, from the base station, can calculate a time of sending the SL data according to the time when the DCI is received, and then can realize the transmission of the SL data.

BRIEF DESCRIPTION OF THE DRAWINGS

The drawings described here are adopted to provide a further understanding to the disclosure, and form a part of the application. Schematic embodiments of the disclosure and descriptions thereof are adopted to explain the disclosure and not intended to put improper limits to the disclosure. In the drawings.

DETAILED DESCRIPTION

In order to understand the features and technical contents of the embodiments in the disclosure in more detail, the implementation of the embodiments of the disclosure will be described in detail with reference to the accompanying drawings. The attached drawings are for reference only and are not intended to limit the embodiments of the disclosure.

In order to facilitate understanding of the technical solutions of the embodiments of the disclosure, the mode 3 and the mode 4 are respectively explained below.

Figure 1:
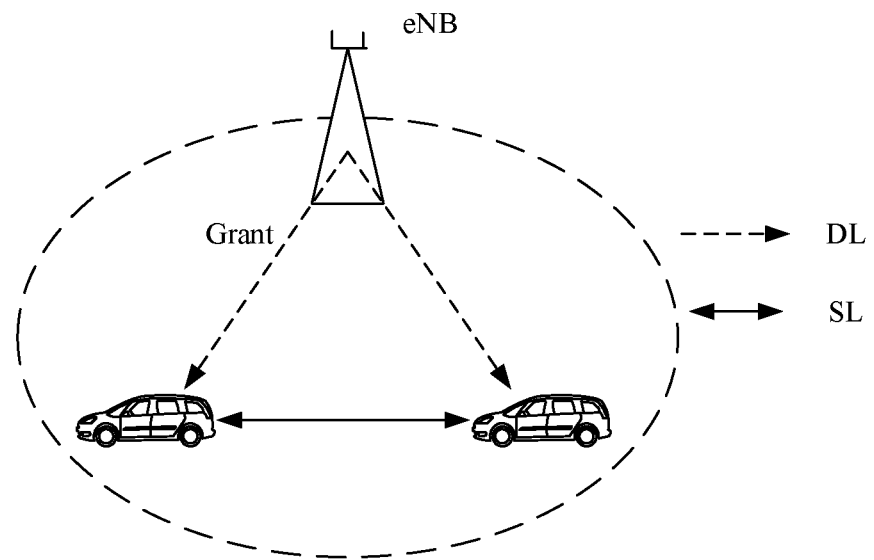
FIG. 1 is a scene diagram of mode 3 in an Internet of vehicles.

Mode 3: As shown in FIG. 1, SL transmission resources of a vehicle terminal can be allocated by a base station (such as an evolved NodeB (eNB) in LTE). Specifically, the base station may issue a control message indicative of grant resources to the vehicle terminal through DL. Then, the vehicle terminal may send data on an SL according to the resources allocated by the base station. In the mode 3, the base station may allocate resources for a single transmission to the vehicle terminal, and may also allocate resources for a semi-static transmission to the terminal.

Figure 2:
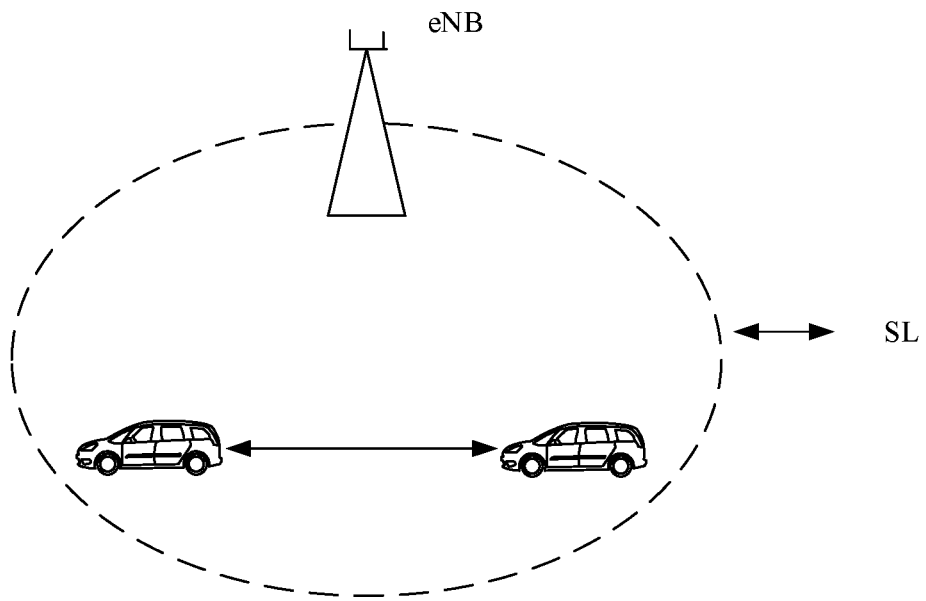
FIG. 2 is a scene diagram of mode 4 in an Internet of vehicles.

Mode 4: As shown in FIG. 2, a vehicle terminal can adopt a manner of sensing+reservation for transmission on an SL. The vehicle terminal may obtain an available transmission resource set from a resource pool by sensing, and the vehicle terminal may randomly select a resource from the transmission resource set for data transmission. Since services in the Internet of vehicles system have periodic characteristics, the vehicle terminal usually adopts a semi-static transmission mode, that is, after the vehicle terminal selects a transmission resource, the resource can be continuously used in multiple transmission cycles, thereby reducing the probabilities of resource re-selection and resource conflicts. The vehicle terminal may carry information for reserving the next transmission resource into the control information transmitted presently, so that other terminals can determine whether this resource is reserved and used by the vehicle terminal by detecting the control information of the vehicle terminal to achieve the purpose of reducing resource conflicts.

Based on the mode 3 in the Internet of vehicles system, the embodiments of the disclosure provide a method for determining a transmission time. A terminal may receive scheduling information of a base station, and send data after n+k time according to a time unit of an SL in accordance with a symbol finally received, the symbol finally received being used as a reference time for calculating a sending time.

Figure 3:
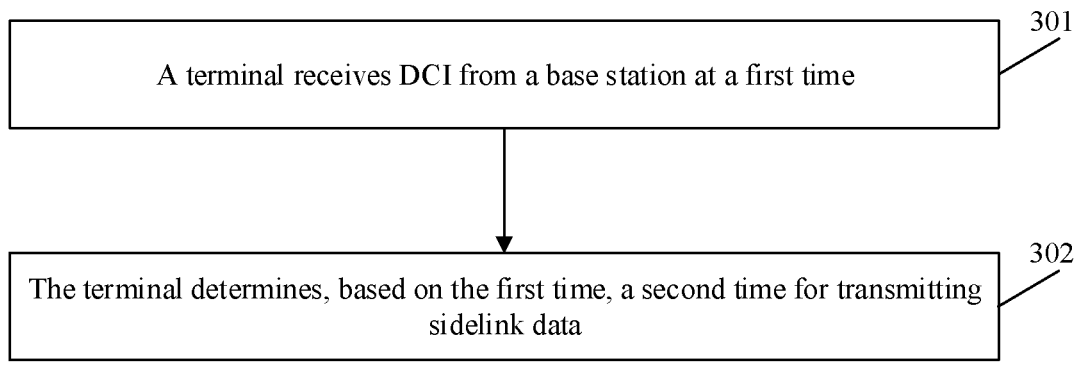
FIG. 3 is a flowchart of a method for determining a transmission time according to an embodiment of the disclosure.

FIG. 3 is a flowchart of a method for determining a transmission time according to an embodiment of the disclosure. As shown in FIG. 3, the method for determining a transmission time includes the following steps.

In step 301, a terminal receives DCI from a base station at a first time.

In the embodiments of the disclosure, an SL can measure a transmission time by taking a first time unit. In an implementation, the first time unit may be an sTTI. For example, one sTTI includes 4 OFDM symbols. In another embodiment, the first time unit may be a normal subframe, such as a subframe of 1 ms.

In the embodiments of the disclosure, the terminal may take time at which the last symbol carrying the DCI is received as the first time, or the terminal may take time at which the last symbol of a subframe or of a slot carrying the DCI is received as the first time.

For example, the symbols carrying the DCI may include: symbol 1, symbol 2, and symbol 3. The time when the terminal receives symbol 3 may be taken as the first time. Further, a subframe or a slot of the SL corresponding to the time when the terminal receives symbol 3 may be taken as the first time.

For example, the subframe in which the DCI is carried includes 14 OFDM symbols, and the DCI includes three symbols: symbol 1, symbol 2, and symbol 3. The time when the terminal receives the last symbol of the subframe in which the DCI is located (i.e., the 14th symbol) may be taken as the first time. Further, a subframe or a slot of the SL, corresponding to the time when the terminal receives the last symbol (i.e., the 14th symbol) of a subframe in which the DCI is located, may be taken as the first time.

In step 302, the terminal determines, based on the first time, a second time for transmitting sidelink data.

In the embodiments of the disclosure, the first time and the second time may be both measured by a first time unit.

Assuming that based on the measurement by the first time unit, the first time is n, it may be determined that the second time is n+k based on the value of n, k is a preset value or a value obtained from the network.

In the embodiments of the disclosure, time at which the DCI is sent by the base station may be a third time. The terminal may send uplink information to the base station at a fourth time before the terminal receives the DCI from the base station at the first time, and time at which the base station receives the uplink information may be a fifth time.

In the embodiments of the disclosure, the base station may take time at which the last symbol carrying the uplink information is received as the fifth time, or the terminal may take time at which the last symbol of a subframe or of a slot carrying the uplink information is received as the fifth time.

In the above solution, the interactions between the terminal and the base station in a chronological order may be that: the terminal sends uplink information to the base station at a fourth time, time at which the base station receives the uplink information being a fifth time; then, the base station sends DCI to the terminal at the third time, and the terminal receives the DCI from the base station at the first time, and starts transmitting SL data at the second time.

The sequence of the above times may be: the fourth time, the fifth time, the third time, the first time, and the second time.

The third time and the fifth time may be measured by a second time unit, and the second time unit may be a time unit used by DL.

It is worth noting that the second time unit and the first time unit may be different time units or the same time unit. The second time unit and the first time unit may have the following relationship:

the first time unit is larger than the second time unit; or
the first time unit is smaller than the second time unit; or
the first time unit is equal to the second time unit.

In order to meet a delay demand, a duration between the fourth time and the second time may be less than a duration corresponding to the delay demand of the terminal.

The technical solutions of the embodiments of the disclosure are further described below with reference to specific application examples.

Application Example 1

Figure 4:
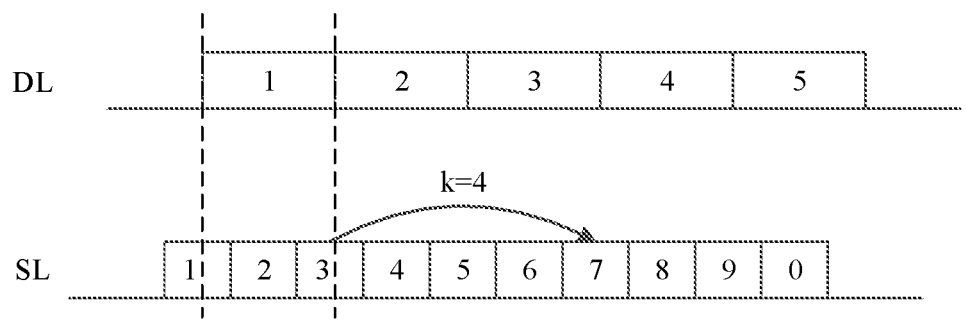
FIG. 4 is a diagram 1 of a transmission time according to an embodiment of the disclosure.

As shown in FIG. 4, a second time unit of DL is larger than a first time unit of an SL. The terminal may start to receive DCI at time 1 of the SL, and complete reception at time 3. In such a case, time when the terminal receives the DCI may refer to time when the last symbol of the DCI is received, that is, time 3.

The terminal may send SL data at time n+k of the SL, such as k=4 as shown in the figure, that is, the SL data is sent at time 7.

Application Example 2

Figure 5:
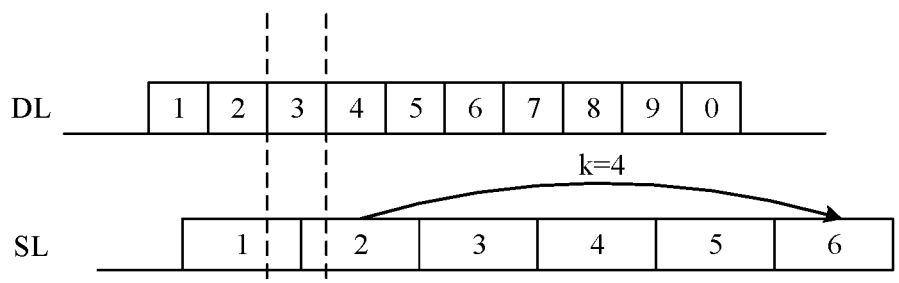
FIG. 5 is a diagram 2 of a transmission time according to an embodiment of the disclosure.

As shown in FIG. 5, a second time unit of DL is smaller than a first time unit of an SL.

The terminal may start to receive DCI at time 1 of the SL, and complete reception at time 2. In such a case, time when the terminal receives the DCI refers to time when the last symbol of the DCI is received, that is, time 2.

The terminal may send SL data at time n+k of the SL, such as k=4 as shown in the figure, that is, the SL data is sent at time 6.

Figure 6:
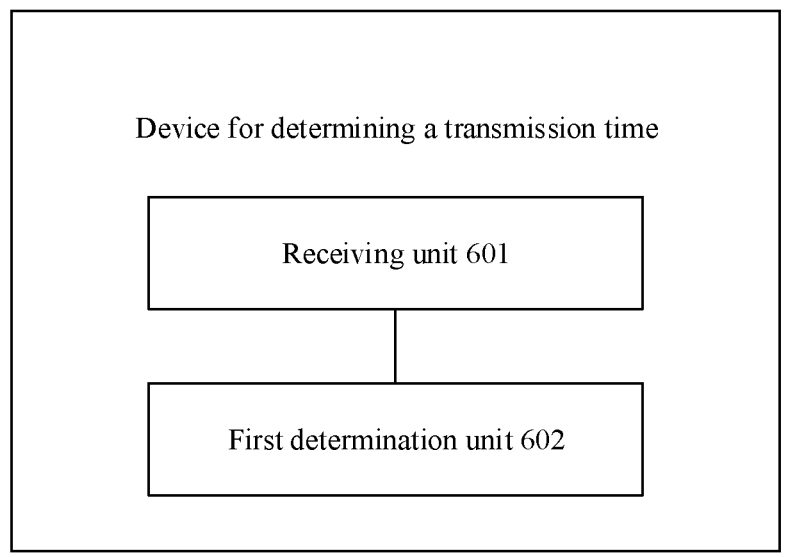
FIG. 6 is a structure diagram 1 of a device for determining a transmission time according to an embodiment of the disclosure.

FIG. 6 is a structure diagram 1 of a device for determining a transmission time according to an embodiment of the disclosure. As shown in FIG. 6, the device includes: a receiving unit 601 and a first determination unit 602.

The receiving unit 601 is configured to receive DCI from a base station at a first time.

The first determination unit 602 is configured to determine, based on the first time, a second time for transmitting sidelink data.

Those skilled in the art should know that functions realized by each unit in the device for determining a transmission time as shown in FIG. 6 may be understood with reference to the related descriptions in the above-mentioned method for determining a transmission time. The functions of each unit in the device for determining a transmission time as shown in FIG. 6 can be realized through a program running on a processor, and can also be realized through a specific logical circuit.

Figure 7:
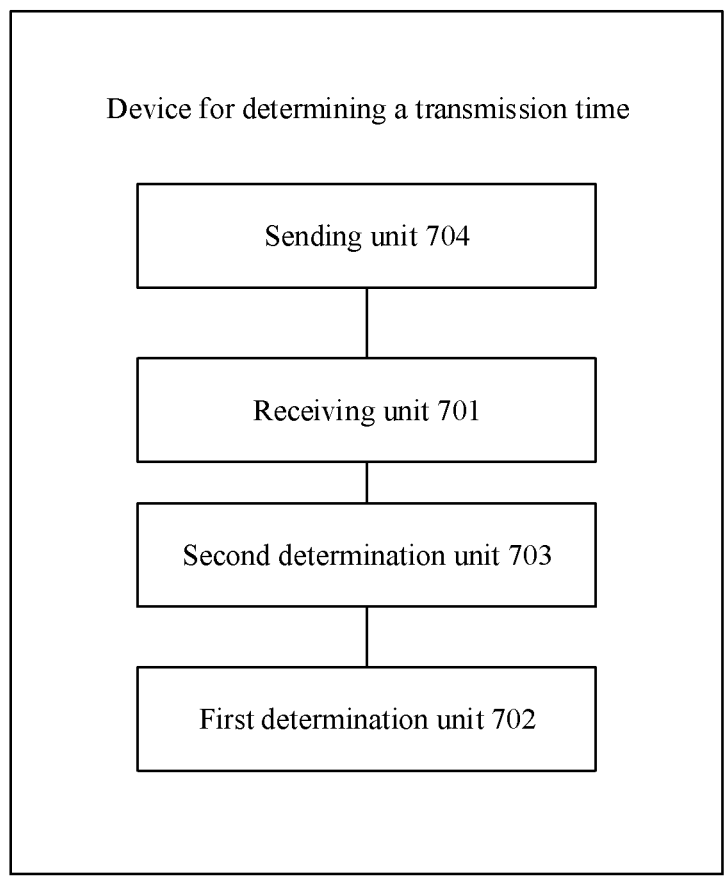
FIG. 7 is a structure diagram 2 of a device for determining a transmission time according to an embodiment of the disclosure.

FIG. 7 is a structure diagram 2 of a device for determining a transmission time according to an embodiment of the disclosure. As shown in FIG. 7, the device includes: a receiving unit 701 and a first determination unit 702.

The receiving unit 701 is configured to receive DCI from a base station at a first time.

The first determination unit 702 is configured to determine, based on the first time, a second time for transmitting sidelink data.

In the embodiments of the disclosure, the device may further include a second determination unit 703.

The second determination unit 703 is configured to take time at which the last symbol carrying the DCI is received as the first time; or take time at which the last symbol of a subframe or of a slot carrying the DCI is received as the first time.

In the embodiments of the disclosure, the first time and the second time may be measured by a first time unit, and the first time unit may be a time unit used by an SL.

In the embodiments of the disclosure, time at which the DCI is sent by the base station may be a third time.

In the embodiments of the disclosure, the device may further include: a sending unit 704, configured to send uplink information to the base station at a fourth time, time at which the base station receives the uplink information being a fifth time.

In the embodiments of the disclosure, the fifth time may be specifically determined by a following manner:

the base station takes time at which the last symbol carrying the uplink information is received as the fifth time; or the base station takes time at which the last symbol of a subframe or of a slot carrying the uplink information is received as the fifth time.

In the embodiments of the disclosure, the third time and the fifth time may be measured by a second time unit, and the second time unit may be a time unit used by a downlink.

In the embodiments of the disclosure, a duration between the fourth time and the second time may be less than a duration corresponding to a delay demand of the terminal.

Those skilled in the art should know that functions realized by each unit in the device for determining a transmission time shown in FIG. 7 may be understood with reference to the related descriptions in the above-mentioned method for determining a transmission time. The functions of each unit in the device for determining a transmission time shown in FIG. 7 may be realized through a program running on a processor, and may also be realized through a specific logical circuit.

When being implemented in form of software function modules and sold or used as an independent product, the device for determining a transmission time of the embodiments of the disclosure may also be stored in a computer-readable storage medium. Based on such an understanding, the technical solutions of the embodiments of the disclosure substantially or the parts making contributions to the conventional art may be embodied in form of software product, and the computer software product may be stored in a storage medium, including a plurality of instructions configured to enable a computer device (which may be a personal computer, a server, a network device or the like) to execute all or part of the method in each embodiment of the disclosure. The storage medium may include: various media capable of storing program codes such as a U disk, a mobile hard disk, a Read Only Memory (ROM), a magnetic disk or an optical disk. Therefore, the embodiments of the disclosure are not limited to any specific hardware and software combination.

Correspondingly, the embodiments of the disclosure also provide a computer storage medium, having a computer-executable instruction stored thereon which, when executed by a processor, enables to implement the method for determining a transmission time of the embodiments of the disclosure.

Figure 8:
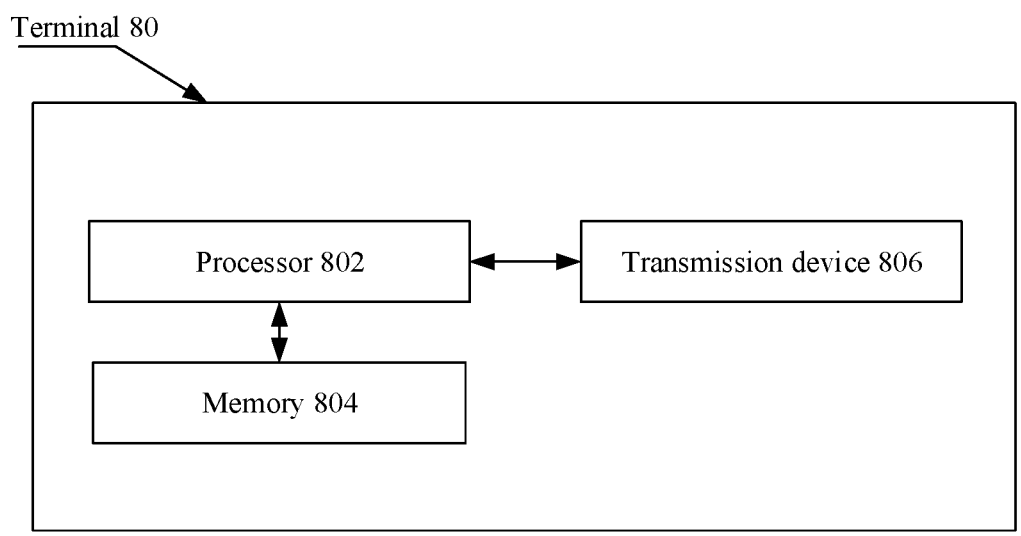
FIG. 8 is a structure diagram of a terminal according to an embodiment of the disclosure.

FIG. 8 is a structure diagram of a terminal according to an embodiment of the disclosure. The terminal 80 may include one or more (only one is illustrated in the figure) processors 802 (the processor 802 may include, but not limited to, a processing device such as a Micro Controller Unit (MCU) or a Field Programmable Gate Array (FPGA)), a memory 804 configured to store data and a transmission device 806 configured for implementing a communication function. Those of ordinary skill in the art should know that the structure shown in FIG. 8 is only schematic and not intended to limit the structure of the electronic device. For example, the terminal 80 may further include components more or fewer than the components shown in FIG. 8 or has a configuration different from that shown in FIG. 8.

The memory 804 may be configured to store a software program of application software and a module, for example, a program instruction/module corresponding to a method in the embodiments of the disclosure. The processor 802 may run the software program and module stored in the memory 804, thereby executing various functional applications and data processing, namely implementing the above-mentioned method. The memory 804 may include a high-speed random access memory and may also include a nonvolatile memory, for example, one or more magnetic storage devices, flash memories or other nonvolatile solid-state memories. In some examples, the memory 804 may further include a memory arranged remotely relative to the processor 802, and the remote memory may be connected to the terminal 80 through a network. An example of the network can include, but not limited to, the Internet, an intranet, a local area network, a mobile communication network and a combination thereof.

The transmission device 806 is configured to receive or send data through a network. A specific example of the network may include a wireless network provided by a communication provider of the terminal 80. In an example, the transmission device 806 includes a Network Interface Controller (NIC), which may be connected with another network device through a base station, thereby communicating with the Internet. In an example, the transmission device 806 may be a Radio Frequency (RF) module, configured to communicate with the Internet in a wireless manner.

The technical solutions recorded in the embodiments of the disclosure may be freely combined without conflicts.

In some embodiments provided by the disclosure, it is to be understood that the disclosed method and intelligent device may be implemented in other manners. The device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, namely, may be located in the same place, or may also be distributed to multiple network units. Part of all of the units may be selected according to a practical requirement to achieve the purposes of the solutions of the embodiments.

In addition, each functional unit in each embodiment of the disclosure may be integrated into a second processing unit, each unit may also serve as an independent unit and two or more than two units may also be integrated into a unit. The integrated unit may be implemented in a hardware form and may also be implemented in form of hardware and software functional unit.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure.

The invention claimed is:

1. A method for determining a transmission time, comprising:
receiving, by a terminal, Downlink Control Information (DCI) from a base station at a first time, wherein time at which the DCI is sent by the base station is a third time;
determining, by the terminal, a second time for transmitting sidelink data based on the first time; and
sending, by the terminal, uplink information to the base station at a fourth time before the terminal receives the DCI from the base station at the first time, wherein time at which the base station receives the uplink information is a fifth time;
wherein a duration between the fourth time and the second time is less than a duration corresponding to a delay demand of the terminal.

2. The method according to claim 1, further comprising:
taking, by the terminal, time at which a last symbol carrying the DCI is received as the first time; or
taking, by the terminal, time at which a last symbol of a subframe or of a slot carrying the DCI is received as the first time.

3. The method according to claim 1, wherein the first time and the second time are measured by a first time unit, and the first time unit is a time unit used by Sidelink (SL).

4. The method according to claim 1, wherein the fifth time is specifically determined by a following manner:
taking, by the base station, time at which a last symbol carrying the uplink information is received as the fifth time; or
taking, by the base station, time at which a last symbol of a subframe or of a slot carrying the uplink information is received as the fifth time.

5. The method according to claim 1, wherein the third time and the fifth time are measured by a second time unit, and the second time unit is a time unit used by Downlink (DL).

6. A device for determining a transmission time, comprising:
a transmission device, configured to receive Downlink Control Information (DCI) from a base station at a first time, wherein time at which the DCI is sent by the base station is a third time; and a processor, configured to determine, based on the first time, a second time for transmitting sidelink data, wherein the transmission device is further configured to:

send uplink information to the base station at a fourth time, time at which the base station receives the uplink information being a fifth time, wherein a duration between the fourth time and the second time is less than a duration corresponding to a delay demand of the terminal.

7. The device according to claim 6, wherein the processor is further configured to:

take time at which a last symbol carrying the DCI is received as the first time; or take time at which a last symbol of a subframe or of a slot carrying the DCI is received as the first time.

8. The device according to claim 6, wherein the first time and the second time are measured by a first time unit, and the first time unit is a time unit adopted by Sidelink (SL).

9. The device according to claim 6, wherein the fifth time is specifically determined by a following manner:

taking, by the base station, time at which a last symbol carrying the uplink information is received as the fifth time; or taking, by the base station, time at which a last symbol of a subframe or of a slot carrying the uplink information is received as the fifth time.

10. The device according to claim 6, wherein the third time and the fifth time are measured by a second time unit, and the second time unit is a time unit used by Downlink (DL).

11. A non-transitory computer storage medium, having a computer-executable instruction stored thereon which, when executed by a processor, enables to implement the steps of the method according to claim 1.

12. The device according to claim 7, wherein the first time and the second time are measured by a first time unit, and the first time unit is a time unit used by Sidelink (SL).

* * * * *